Figure 1:
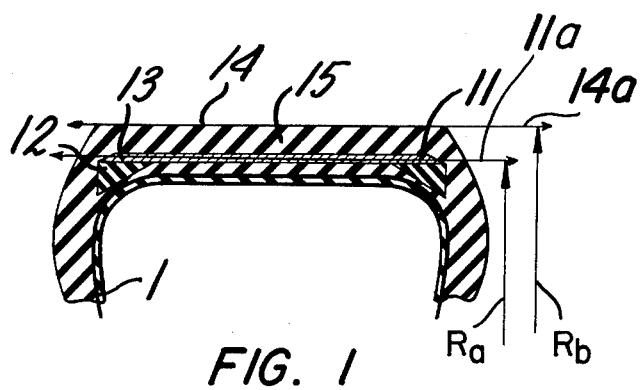

United States Patent [19]

Devaux

[11] 4,254,811
[45] Mar. 10, 1981

[54] PNEUMATIC TIRES
[75] Inventor: Edmond-Yves Devaux, Clermont-Ferrand, France
[73] Assignee: Compagnie Generale des Etablissements Michelin, Clermont-Ferrand, France
[21] Appl. No.: 870,858
[22] Filed: Jan. 19, 1978
[30] Foreign Application Priority Data
Jan. 25, 1977 [FR] France .................... 77 02222
[51] Int. Cl.³ .................................. B60C 11/08
[52] U.S. Cl. ........................ 152/209 D; 152/361 FP
[58] Field of Search .......... 152/209 R, 209 D, 361 R, 152/361 FP, 352 R; D12/136–140

[56] References Cited
U.S. PATENT DOCUMENTS

| D. 60,512 | 3/1922 | Breitenstein | D12/136 |
| D. 64,401 | 4/1924 | Elliott | D12/136 |
| 1,264,205 | 4/1918 | Overman | 152/209 R X |
| 2,781,815 | 2/1957 | Davis | 152/352 R |
| 3,195,604 | 7/1965 | Boussa et al. | 152/361 R |
| 3,516,468 | 6/1970 | Jones | 152/361 FP |
| 3,834,439 | 9/1974 | Mirtain | 152/361 FP |
| 3,976,115 | 8/1976 | Mirtain | 152/209 R X |
| 4,055,209 | 10/1977 | Senger | 152/209 R |
| 4,057,089 | 11/1977 | Johannsen | 152/209 R |

FOREIGN PATENT DOCUMENTS

| 191279 | 9/1956 | Fed. Rep. of Germany | 152/209 R |
| 1096844 | 2/1955 | France | 152/352 R |

Primary Examiner—Randolph A. Reese
Assistant Examiner—D. W. Underwood
Attorney, Agent, or Firm—Brumbaugh, Graves, Donohue & Raymond

[57] ABSTRACT

A pneumatic tire comprising a radial carcass reinforcement and a tread reinforcement imparting to the tread a meridian curvature less than the circumferential curvature is improved by having the percentage of sculpting of the tread increase from the edges of the tread in the direction towards the equatorial zone of the tread.

8 Claims, 9 Drawing Figures

PNEUMATIC TIRES

This invention relates to improvements in pneumatic tires, and more particularly to the treads of tires of a radial type, that is to say tires having a radial carcass reinforcement and a tread reinforcement.

In tires of the type in question, the function of the tread reinforcement is to stabilize the tread, in particular so as to reduce damage thereto as compared with the tread of tires having a carcass reinforcement formed of an equal number of plies of crossed wires or cables. At the present time, some radial tires are the object of a decrease of the meridian curvature of the surface of the tread which is intended to enter into contact with the ground. Thus the meridian curvature of this surface is less, and frequently substantially less, than the circumferential curvature of said surface, that is to say less than the reciprocal of the equatorial radius of the tread, the tire being mounted and normally inflated, but not under load.

However, the decrease in the meridian curvature of the treads results in certain drawbacks. They appear to be due to modifications in the distribution of the unit pressures below the area of contact of such tires having these treads.

As a matter of fact, with the flattening of the treads of such tires it is noted, on the one hand, that the maximum values of the pressure on the ground, which are initially located in the equatorial zone of the area of contact, decrease in absolute value and then give way to minimum values while moving into two zones which are closer to the edges of the area of contact, the smaller the meridian curvature of the tread in the case of a tire which is normally inflated and loaded traveling without deviation or camber on a flat horizontal ground and the tread of which is not provided with recessed elements.

On the other hand, the contour of the contact area is modified, particularly with respect to the front and rear edges thereof. From convex towards the outside they become progressively concave when the meridian curvature of the tread decreases.

The meridian curvature of the treads is reduced by using tread reinforcements which themselves are provided with a zero or small meridian curvature. For this purpose, one can, for instance, use a tread reinforcement comprising at least two superimposed crossed plies of wires or cables which are parallel to each other in each ply and form angles having an absolute value of between 10° and 30° with the equatorial zone of the tire. Another means consists in using a tread reinforcement whose edges are reinforced with respect to the equatorial zone, the angles of the wires or cables of the tread plies which cooperate in the reinforcement of the marginal zones being preferably less than 45° with the equatorial zone of the tire. Another arrangement consists in using a tread reinforcement which is axially wider than the area of contact of the tread with the ground, the edges of said reinforcement protruding axially beyond the ordinary contour of the tire in zones contained between the tread and the sidewalls when the tire is normally inflated and under load.

In general, it is found that the wearing of the treads of such tires, seen in meridian section, is irregular and that their adherence to slippery ground or moist or wet road pavements leaves much to be desired.

The object of the present invention is to overcome these drawbacks and, in particular, to seek, due to a suitable contour of the recessed elements of the tread, as uniform as possible a distribution of pressures in the contact area.

Thus, the pneumatic tire in accordance with the invention comprising a radial carcass reinforcement and a tread reinforcement imparting to the tread a meridian curvature less than the circumferential curvature, is characterized by the fact that the percentage of sculpting of the tread increases from the edges of the tread in the direction towards the equatorial zone of the tread.

By "percentage of sculpting" there is understood, for a zone contained between two lines parallel to the longitudinal median axis of the contact area, which are separated transversely by an arbitrary distance (for instance 1 cm) selected as unit of width, the ratio, expressed in percent, of the surface of the recessed elements or grooves of said zone to the total surface of said zone of the contact area, the tire being normally inflated and under load.

The percentage of sculpting of the tread in accordance with the invention preferably takes into account the amount by which the ground pressures in the area of contact decrease from the edges of the tread in the direction towards the equatorial zone of the tread.

By "meridian curvature" there is understood the transverse of the surface of the tread which is intended to enter into contact with the ground when the tire is normally inflated. This curvature is measured at the equator, that is to say at the level of the parallel along which the tire reaches its greatest radius with respect to the axis of rotation of the tire. If $R_b$ is this equatorial radius, then the reciprocal $1/R_b$ is the equatorial curvature in the circumferential direction. The invention concerns treads whose surface has a meridian or transverse curvature less than the circumferential curvature $1/R_b$, and preferably less than $1/1.5\ R_b$.

Preferably also, the tread reinforcement of the tires in accordance with the invention has a meridian or transverse curvature, defined in a manner similar to that of the tread, which is less than the circumferential curvature $1/R_a$, and preferably less than $1/1.5\ R_a$, $R_a$ being the equatorial radius of the tread reinforcement measured at the level of the parallel along which the tread reinforcement reaches its greatest radius in the circumferential direction.

The arrangement in accordance with the invention favors the uniformity of the wear of the tread in the transverse direction. It, therefore, makes it possible to provide treads arranged on the tread reinforcement having a substantially uniform thickness from one edge of the tread to the other. This makes it possible to save elastomer and avoids having thick lateral zones of the tread which give rise to excessive heating.

The depth of the recessed elements in accordance with the invention, measured from the surface of the tread which is intended to enter into contact with the ground, is preferably approximately constant from the edges of the tread in the direction towards the equatorial zone of the tread.

In the case of tires of the type in question which are intended to serve, at least in part, off the road and, in particular, on heavy vehicles or construction vehicles and vehicles for travel on, for instance, stony ground, the percentage of total sculpting of the tread should be approximately 25%; in any event, it should not be greater than 40%. The percentage of total sculpting is the ratio, expressed in percent, of the surface of the recessed elements or grooves defined by the contour of the contact area to the total surface of the contact area, the tire being normally inflated and under load.

The drawing and the description thereof illustrate embodiments of tread reinforcements and treads in accordance with the invention.

Figure 2:
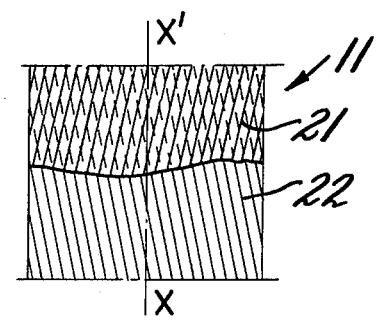
Figure 3:
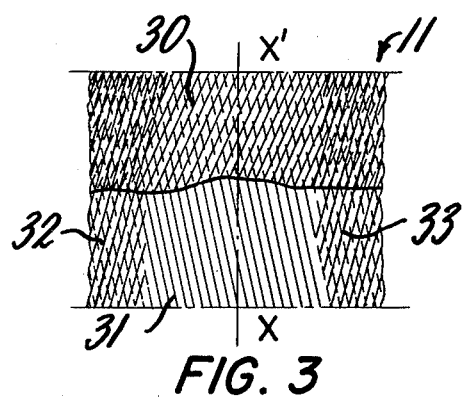
Figure 4:
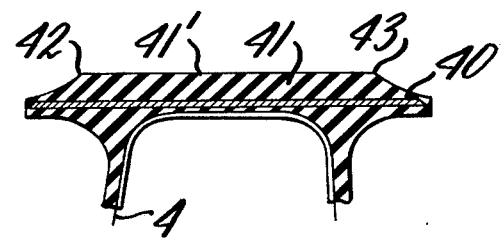

In the drawing:

FIG. 1 is a schematic meridian or transverse section through the region of the tread of a tire with radial carcass reinforcement and tread reinforcement of low meridian or transverse curvature, FIGS. 2 and 3 show tread reinforcement structures capable of being used within the scope of the present invention, FIG. 4 illustrates a partial meridian or transverse section through a tire of the type in question whose tread reinforcement protrudes beyond the edges of the tread, and FIGS. 5 to 9 show portions of treads in accordance with the invention.

FIG. 1 shows a partial meridian or transverse section through a tire having a radial carcass reinforcement 1. The tread reinforcement which is schematically indicated in the form of a block 11 is practically free of meridian or transverse curvature as represented by the transverse substantially straight line 11a, due to profiled parts of rubber 12 arranged between the edges 13 of the tread reinforcement 11 and the radial carcass reinforcement 1. The surface 14 of the tread 15 is also free of meridian or transverse curvature as represented by the transverse straight line 14a.

This figure also shows the equatorial radii $R_a$ and $R_b$ of the tread reinforcement 11 and of the tread 15, respectively.

FIG. 2 shows a tread reinforcement 11 which is formed of two superimposed crossed plies 21 and 22 of wires or cables which are parallel to each other in each ply and form angles having an absolute value of between 10° and 30° with the equatorial zone XX' of the tire.

FIG. 3 also shows a tread reinforcement 11 but here its edges are formed by the foldings of the two ends 32 and 33 of a ply 31 around the edges of a ply 30, the angles formed by the wires or cables of these plies 30 and 31 with the equatorial zone XX' being in opposite direction. The reinforcement of the marginal zones of the tread reinforcement thus obtained can also be effected by means of two independent plies 32 and 33 having wires or cables forming angles preferably less than 45° with the equatorial zone of the tire.

FIG. 4 shows a partial meridian or transverse section through a tire having a radial carcass reinforcement 4 and a tread reinforcement 40 protruding beyond the edges 42 and 43 of the tread 41, i.e., the tread reinforcement 40 is axially wider than the contact area of the tread 41 with the ground. The tread reinforcement 40 is practically cylindrical, in the same way as the surface 41' of the tread 41 intended to enter into contact with the ground. The tread reinforcement 40 can furthermore be one of the types shown in FIGS. 2 and 3.

Figure 5:
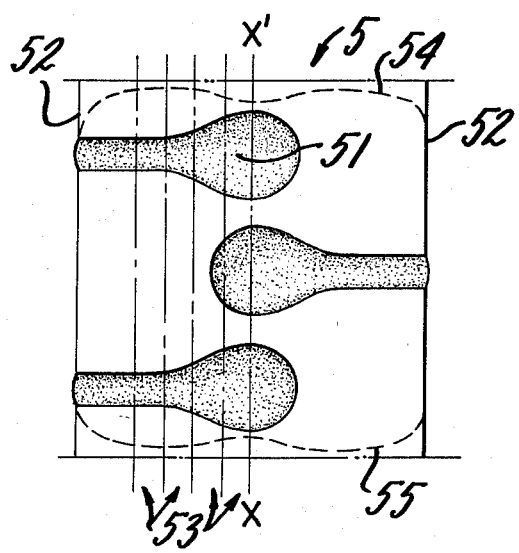
Figure 6:
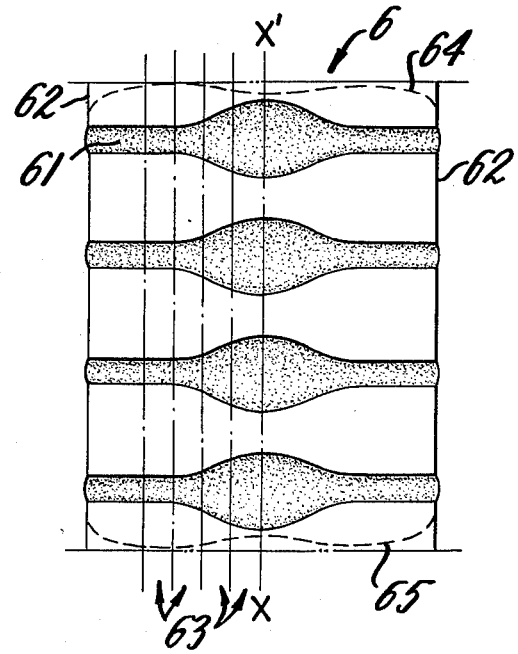

FIGS. 5 and 6 show treads 5 and 6 in accordance with the invention, having transverse grooves 51 and 61, respectively. These transverse grooves 51 and 61, which could also be oblique, have a width which increases from the edges 52 or 62 of the tread 5 or 6 in the direction towards the equatorial zone XX' of the tire.

The grooves 51 extend between each of the edges 52 of the tread 5 and the equatorial zone XX' thereof, while the grooves 61 extend without interruption between the two edges 62 of the tread 6.

In each FIGS. 5 and 6 there have been shown zones 53 (63) of the same width formed of straight lines parallel to each other and parallel to the equatorial zone XX' of the tread. There have also been drawn the front contour (54, 64) and rear contour (55, 65) of the contact area of the tread with the ground. It is noted that the percentage of sculpting, as defined above, of the zones which are thus isolated is higher in the case of the zones 53 (63) which are closer to the equatorial zone XX' of the tread 5 or 6.

Figure 7:
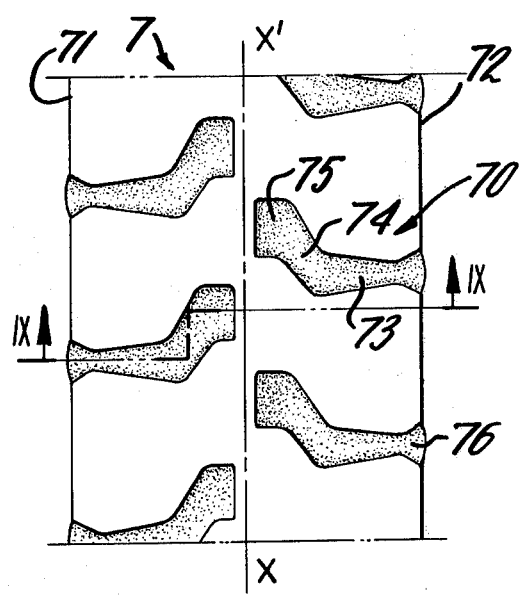

The tread 7 of FIG. 7 has grooves 70 whose width increases from the edges 71 and 72 of the tread 7 towards the equatorial zone XX' of the tread 7. These grooves 70 comprise a transverse segment 73 whose width increases from the edges 71 or 72 of the tread 7 in the direction towards the equatorial zone XX' of the tread 7, are extended by an oblique segment 74 which is wider and forms an angle of about 55° with the equatorial zone XX' of the tread 7 and terminate in a wide flaring 75. Such an arrangement is particularly well-suited for tires of the type in question which are intended to travel at least in part off the road. The percentage of total sculpting, as defined above, is between 25% and 40%.

Figure 9:
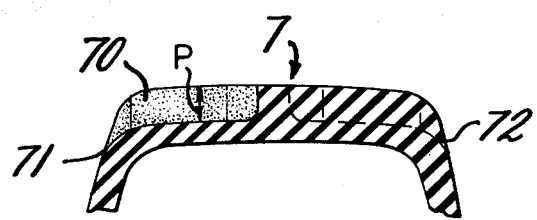

In FIG. 9, which is a view in radial section along the line IX—IX of FIG. 7, it is seen that the depth P of the grooves 70 of the tread 7 is approximately constant from the edges 71 and 72 of the tread 7 in the direction towards the equatorial zone of the tread 7.

Figure 8:
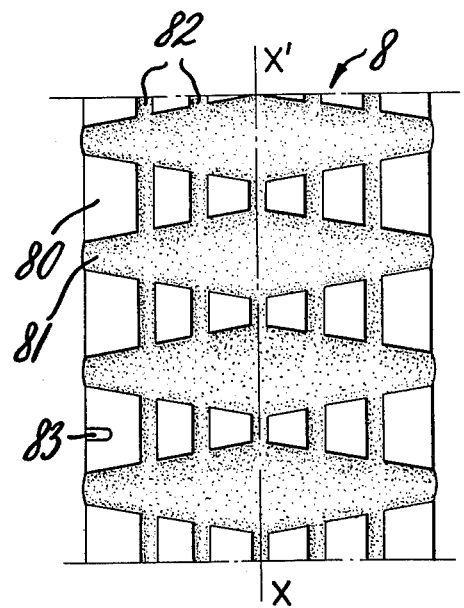

FIG. 8 shows a portion of tread 8 in accordance with the invention intended for use primarily on the road. In order to respect the principle of the invention while assuring satisfactory steering properties, the transverse ribs of decreasing width 80 defined by transverse grooves 81 of increasing width from the edges of the tread 8 in the direction towards the equatorial zone XX' of the tread 8 are cut by narrow circumferential grooves 82.

In the examples shown in FIGS. 5 to 8, it is clear that the edges of the tread may comprise, as is customary, marginal flarings, such as 76 (FIG. 7), and/or small grooves, such as the groove 83 (FIG. 8), in the zone of the shoulders, which do not affect the definition of the invention as it appears from the following claims.

The principle of the invention applies both to tires having a symmetrical or asymmetrical tread reinforcement and to tires in which the distribution of the unit pressures below the contact area is symmetrical or asymmetrical, the contour of said contact area being itself symmetrical or asymmetrical with respect to the equatorial zone of the tire.

Finally, although the principle of the invention seems more readily applicable by means of grooves of average transverse orientation, that is to say greater than 45° with respect to the circumferential direction, this principle does not exclude the use of grooves of average circumferential orientation, that is to say less than 45° with respect to the circumferential direction.

What is claimed is:

1. An off-the-road pneumatic tire comprising a radial carcass reinforcement and a tread reinforcement imparting to the tread a meridian curvature less than the circumferential curvature, characterized by the fact that:

the tread reinforcement is axially wider than the contact area of the tread with the ground;

the percentage of sculpting of the tread increases from the edges of the tread in the direction towards the equatorial zone of the tread, said percentage of sculpting of the tread taking into account the amount by which the 2. Pneumatic tire according to claim 1, characterized by the fact that the tread has a meridian curvature less than $1/1.5\ R_b$, $R_b$ being the equatorial radius of the tread with respect to the axis of rotation of the tire.

3. Pneumatic tire according to claim 1, characterized by the fact that the tread reinforcement has a meridian curvature of less than $1/1.5\ R_a$, $R_a$ being the equatorial radius of the tread reinforcement with respect to the axis of rotation of the tire.

4. Pneumatic tire according to claim 1, characterized by the fact that the tread arranged on the tread reinforcement has a substantially uniform thickness from one edge of the tread to the other edge.

5. Pneumatic tire according to claim 1, characterized by the fact that said grooves have a depth which is approximately constant from the edges of the tread in the direction towards the equatorial zone of the tread.

6. Pneumatic tire according to claim 3, characterized by the fact that the tread reinforcement has at least two superimposed crossed plies of wires or cables which are parallel to each other in each ply and form angles having an absolute value of between 10° and 30° with the equatorial zone of the tire.

7. Pneumatic tire according to claim 3, characterized by the fact that the tread reinforcement has marginal zones reinforced by the foldings of a ply, the angles of the wires or cables of the plies which cooperate in the reinforcement of the marginal zones being preferably less than 45° with the equatorial zone of the tire.

8. Pneumatic tire according to claim 3, characterized by the fact that the tread reinforcement has marginal zones reinforced by independent plies, the angles of the wires or cables of the plies which cooperate in the reinforcement of the marginal zones being preferably less than 45° with the equatorial zone of the tire.

* * * * *

UNITED STATES PATENT AND TRADEMARK OFFICE
CERTIFICATE OF CORRECTION

PATENT NO. : 4,254,811

DATED : March 10, 1981

INVENTOR(S) : Edmond-Yves Devaux

It is certified that error appears in the above—identified patent and that said Letters Patent is hereby corrected as shown below:

First page, second column, first item under "FOREIGN PATENT DOCUMENTS", "Fed. Rep. of Germany" should read -- Austria --.
Col. 2, line 26, after "transverse" insert -- curvature --.
Cols. 4 and 5, claim 1, "1. An off-the-road pneumatic tire comprising a radial carcass reinforcement and a tread reinforcement imparting to the tread a meridian curvature less than the circumferential curvature, characterized by the fact that:

the tread reinforcement is axially wider than the contact area of the tread with the ground;

the percentage of sculpting of the tread increases from the edges of the tread in the direction towards the equatorial zone of the tread, said percentage of sculpting of the tread taking into account the amount by which the"

should read as follows:

-- 1. An off-the-road pneumatic tire comprising a radial carcass reinforcement and a tread reinforcement imparting to the tread a meridian curvature less than the circumferential curvature, characterized by the fact that:

UNITED STATES PATENT AND TRADEMARK OFFICE
CERTIFICATE OF CORRECTION

PATENT NO. : 4,254,811

DATED : March 10, 1981

INVENTOR(S) : Edmond-Yves Devaux

It is certified that error appears in the above—identified patent and that said Letters Patent is hereby corrected as shown below:

the tread reinforcement is axially wider than the contact area of the tread with the ground;

the percentage of sculpting of the tread increases from the edges of the tread in the direction towards the equatorial zone of the tread, said percentage of sculpting of the tread taking into account the amount by which the ground pressures in the area of contact decrease from the edges of the tread in the direction towards the equatorial zone of the tread, said ground pressures being measured when the tire is normally inflated and under load, said percentage of sculpting of the tread being increased by providing said tread with unobstructed grooves whose width increases from the edges of the tread in the direction towards the equatorial zone of the tread, each said groove comprising a first transverse segment, a second wider oblique segment forming an angle of about 55° with the equatorial zone of the tread and terminating in a third segment comprising a wide flaring;

the percentage of total sculpting of the tread is between 25% and 40%, and preferably is approximately 25%. --.

Signed and Sealed this

Fourteenth Day of July 1981

[SEAL]

Attest:

GERALD J. MOSSINGHOFF

Attesting Officer

Commissioner of Patents and Trademarks